United States Patent Office 3,256,182
Patented June 14, 1966

3,256,182
LUBRICATING SEALANT
George F. Scherer, Oakland, Calif., assignor to Rockwell Manufacturing Company, Pittsburgh, Pa., a corporation of Pennsylvania
No Drawing. Filed June 17, 1963, Ser. No. 288,465
9 Claims. (Cl. 252—15)

This application is a continuation-in-part of application No. 77,773 filed December 22, 1960 and now abandoned. The latter application is a continuation-in-part of application No. 623,724 filed October 30, 1956, which is a continuation of application No. 179,557 filed August 15, 1950. Application Nos. 623,724 and 179,557 have been abandoned.

My invention relates to sealing and lubricating compositions, and to methods of formulation and production of the compositions. More particularly, my invention and discoveries relate to energizable lubricants and lubricating sealants for use in the sustained or automatic maintenance of sealing and lubricating films on the bearing and seating surfaces of valves, step bearings, oscillating bearings, ball and roller bearings, and sealed gear trains, such as water meter gearing, and the like.

The introduction of the lubricated plug cock with which the lubricants of the present invention are particularly useable brought to the valve field a new conception of pipeline control. In other types of valves, ultimate valve closure is normally effected either by mechanical distortion of the metal seats or by the use of some type of fibrous packing material. The introduction of a plastic sealing material or lubricant between two closely adjacent metal closure surfaces, which limits the rate of flow to a negligible amount, and the providing of means for renewal of this material when necessary, opened up new structural possibilities in positively sealed valves for controlling the flow of fluids in pipelines, and also opened up new requirements and needs in the lubricant field. The lubricant used in a lubricated valve is subject to the destructive action of the line fluid as regards its solvent power and washing power, and, very frequently in industrial service, the effect of elevated temperature or sub-zero temperatures. Hence, in addition to providing the desired properties of viscosity, wetting power, and thermal resistance, the valve lubricant must maintain these properties to a reasonable degree in the presence of the line fluid. Moreover, since the volume of line fluid passing through the valve may be several million times the volume of lubricant in the valve, it will be obvious that lubricant must be carefully chosen if the line fluid possesses high solvent power or has an appreciable chemical reactivity.

Fortunately, not all valve services combine to a large degree all the conditions pointed out above, and by the selection of basically different types of lubricant, it is possible to cover a very wide range of conditions with a reasonable number of lubricants.

Since the lubricated plug cock is normally operated at a very low velocity of rotation, the required lubricating properties of the valve lubricants are rather easily obtained and attention can be focused on the other required characteristics. So long as a satisfactory film of the sealing plastic can be maintained on the bearing surfaces of the plug cock, the metal surfaces are protected and easy operation may be secured without special regard to the oiliness or friction reducing properties of the lubricant. This varies, of course, with the particular service and size of valves concerned.

In general, for the purposes of considering the lubricant-sealing material of the present invention characterized by a stable dispersion of small gas bubbles therein, lubricant services may be broken down into four general service groups according to fluids which will contact the lubricant in normal use. These groups involve fluids which are (1) organic solvents (2) hydrocarbon-water mixtures (3) chemical solutions and (4) gases. The compositions of the present invention have ingredients selected which are particularly resistant to hydrocarbon-water mixtures and are therefore preferably used in this service. Applicant has other copending applications which disclose lubricants for the other above named service groups.

Among the hydrocarbon-water mixtures which the lubricants of the present invention are suitable for use with are:

(1) Petroleum hydrocarbons or, mixtures of petroleum hydrocarbons and acids, alkalies and water.

(2) Drilling mud with crude oil.

(3) Combinations of aqueous and organic condensates in natural and manufactured gas lines.

Lubricated plug valves which are in general use in industry today, present particularly difficult lubricating and sealing problems. In such valves, incompressible plastic lubricants of such viscosity as to be identified as a grease are stored in a reservoir and this reservoir is connected by suitable ducts with surface grooves either on the valve plug or the valve body, or both, for conducting the lubricant to the seating surfaces between the valve plug and body to lessen the turning effort and provide an effective plastic seal between the valve plug and body for preventing leakage of the line fluid under differential pressure. In some of these valves the lubricant is subjected to high pressures when employed to exert a jacking action on the plug to unseat it when frozen or difficult to turn.

Since valve lubricants must be plastic to allow movement of the lubricant through the provided ducts and channels in the valve structure and to permit the forming of a sealing film on the closure surfaces, complete lubrication is not attained unless continuous feeding pressure is applied in sufficient amount to continuously replenish lubricant loss through dissolution in the line fluid, gradual displacement by line pressure, or loss from the lubricant channels in the seating surfaces as they are momentarily exposed in operation, or from other causes.

Normally, in adding lubricant to the valve, either in the form of lubricant sticks, subsequently put under pressure by the lubricant screw, or by injecting lubricant by means of a grease gun, or other contrivance, the lubricant throughout the lubricant reservoir and lubricant passageway is under pressure. As conventional lubricants are incompressible, the lubricant within the valve stops flowing as soon as the extraneous force used for moving the lubricant ceases, and upon the escape of a small fraction of the enclosed fluid the internal lubricant pressure drops rapidly to zero.

Lubricated valves employing the conventional incompressible lubricants are therefore at best only momentarily lubricated at full efficiency, since some of the lubricant forming the lubricant barrier against leakage is in general rapidly displaced due to pressure of the line fluid, dissolution in the line fluid, or other causes. In addition, a portion of the lubricant sealing film is scraped off the sealing surfaces when such valves are operated, and comparatively large volumes of lubricant may be lost due to momentary exposure of certain of the lubricant channels, depending upon the valve design.

Even when additional lubricant is injected into the valve at rather frequent intervals to make up for such losses, during the periods of time between these successive additions of lubricant, the continuity of the lubricant sealing film may be broken permitting leakage of line fluid. If through neglect in replenishing such lubricant as may be lost during the normal operation of the valve, or if comparatively long intervals of time pass between such renewals, not only may excessive leakage develop, but the valve itself may be damaged because of access of the line fluid to working parts of the metal structure, with subsequent corrosion or erosion of these parts, and the valve may be rendered mechanically inoperative.

To maintain complete lubrication and sealing in a valve, the losses of lubricant and sealant in operation must be immediately and continuously replaced, and this is impossible with periodic relubrications using prior methods. Continuous lubrication with and without sealing is also important in a wide variety of other mechanical devices having relatively movable parts. Periodic lubrication of such equipment, even though frequent, at best is inadequate to secure, and does not maintain, continuous effective lubrication or sealing, since the lubricant losses are not immediately replenished.

The unsuccessful prior efforts to meet the demand for maintaining equipment in properly lubricated condition include numerous devices and mechanisms of various types dependent upon external force, including line pressure effects in valves, to mechanically apply feeding pressures to reservoirs of incompressible lubricating and sealing compounds. Such devices are costly and in general either over or under lubricate the equipment, and have been either too cumbersome or expensive for general use. For example, the efforts to keep valves continuously lubricated, generally include mechanisms either built in as part of the valve structure or added to the valve as an additional part of the mechanism.

My present invention and discoveries solve the foregoing problems and meet the above noted demands for certain types of equipment. In lubricated valves this is accomplished without change in, or addition to, the existing structures, and for a wide range of temperatures and services. This I accomplished by making the lubricant and sealant compositions themselves inherently energizable by substantially permanently dispersing gas bubbles therein. Such compositions, when confined in reservoir spaces, are readily flowable solely under their own pressure of energization through the normal filling and distributing channels to the surface areas to be sealed and lubricated, and over these surfaces through the normal operating clearances, to maintain effective sealing and lubricating films by continuous replacement of the losses that occur in normal operation for long periods of time, without however, oozing or feeding out excessively from the end clearance areas, thereby maintaining the equipment continuously in optimum operating condition over long periods of time without need of relubrication.

The feeding of lubricants and sealants from reservoirs to bearing and sealing surfaces, requires the application of energy to effect displacement from one location to another. Instead of depending upon the application of extraneous forces furnished by means of mechanical contrivances, such as previously done by compressed springs or by line fluid pressure, I store energy in the composition itself during the act of injecting the lubricant composition into the reservoir, which is then available to provide continuous and automatic replacement of the lubricant seal as it is removed.

In my improved valve sealants and lubricants, I incorporates gases in a stabilized dispersed gas phase, providing energizability under variable pressure, and in which gas bubbles or vesicles of sufficiently small size are dispersed throughout the mass so they will form no breaks across the lubricant grooves or distributing channels, and will permit no deficiency of plastic sealing lubricating material to develop, thus establishing and maintaining an effective sealant and lubricant barrier between the closure surfaces. In other words, the gas bubbles which form the discrete phase are dispersed throughout the mass in units sufficiently small to prevent line fluid channeling through the sealed areas.

Merely including large bubbles or pockets of compressible gas within the lubricant or sealant, or in the storage reservoir, and storing energy in these large gas bubbles by compressing them to a sufficient extent to move the lubricant, will not provide satisfactory means for obtaining the desired results. For example, when large bubbles of compressed gas reach the sealing surfaces, leakage paths for line fluid result.

The British patent to Ridgill No. 20,059 of 1907 discloses the idea of combining certain hydrocarbon oils and greases by first blending and melting them together and then subjecting them to a mechanical action such as grinding, beating or pulverizing so as to create a foamy creamy fluid lubricant. This foamy lubricant of Ridgill is not intended to be a compressible and expansible lubricant providing automatic lubrication and cannot be used for the purposes of my invention. Such compositions, as hereinafter set forth in detail, when subjected to compressions sufficient for energization purposes, lose their energizability and expansibility and fail to function automatically to produce sustained lubrication.

Particularly in lubricated valve service, in addition to the pressures and stresses of distribution of the lubricants and sealants through tortuous channels to and over the sealing surfaces, the lubricants and sealants must be operative over wide temperature ranges in service, must resist attack from wide varieties of line fluids, and must in some valve designs withstand the considerably higher pressures required to jack or lift the plugs from their seats in event of freezing or sticking due to corrosion or failure to relubricate adequately, without substantial loss of energizability due to bubble or vesicle rupture.

While energizability in accordance with my invention, even for a short period of time, is beneficial in lubricating and sealing service because of establishment and maintenance of more complete and adequate films over bearing and sealing surfaces due to the dynamic flow through the normal surface clearances and into the interstices and leak paths during the period of energization, and such compositions are contemplated as within the scope of my invention, my preferred compositions will retain their energizability and stored energy over long periods of time under high pressures.

My preferred improved compositions are sufficiently plastic to be injected into the valves and flow through the grooving and distributing ducts in commercially injectable form, and to provide hydraulic jacking while resisting operating and flow strains without bubble rupture or coalescing into large bubbles and leak paths; they will retain elastically deformable bubbles of gas under compression for months and at the same time will wet and adhere adequately to the surfaces to be sealed and lubricated without, however, exuding excessively from the sealing surfaces under the pressure of energization. Notwithstanding the foregoing characteristics these compositions flow readily through the provided distribution passages in the valves. They also resist displacement by high line pressures and over a wide range of temperature.

References in the technical literature to elements favorable to the production of foams or froths such as surface tension, polarity, dust and the like cannot be solely relied upon for the formulation of my improved compositions, and while the initial incorporation of dispersed small gas bubbles in conventional valve lubricants capable of such incorporation has resulted in some improvement, this has not resulted in lubricants having all of the foregoing desirable charcteristics in adequate degree for general commercial use in existing designs of lubricated valves.

In the lubricants of the present invention I incorporate a satisfactory degree of compressibility and expansibility, by dispersing throughout the lubricant mass an appreciable amount of discrete small bubbles of compressible gas which is chemically inert with respect to the lubricant matrix, such as air, carbon dioxide, nitrogen, or other fixed gases, to provide energizability in the lubricant mass by subsequent compression of the dispersed gas bubbles. I preferably obtain this dispersion of the gas phase of my lubricant in small discrete bubbles uniformly distributed throughout the mass by dispersing the gas into the lubricant base in a suitable jacketed agitator or mixer within predetermined temperature limits enabling most efficient bubble incorporation. However, incorporation of the desired amount of compressible gas in my lubricant by employing reactive chemicals capable of generating discrete gas bubbles throughout the mass by heating, or by incorporating materials which contain dissolved gas that may readily be evolved by means of heat, chemical reaction, or the like, are also contemplated as within the scope of my invention.

The stability of the dispersion of gas particles, or capability of the composition to retain bubbles is enhanced by making the lubricant compositions substantially water free due to the improved performance of the gas retaining, or entraining, agent which is utilized to effect bubble retention in the compositions of the present invention.

The rate of lubricant consumption determines the total amount of energization required to keep valves in a fully lubricated condition for long periods of time. This total amount of available energization in any given composition is determined by the volumetric capacity of the lubricant reservoir in the valve and the pressure to which the lubricant mass is subjected. Therefore, lubricants containing only a small amount of dispersed gas bubbles, say in the neighborhood of 1 percent, require valves with very large lubricant reservoirs and constructional features which permit the use of very high lubricant pressures. To adapt my improved compositions to valves which are already in service, I use compositions containing large amounts of dispersed gas so they can be operated at comparatively low lubricant pressures in the reservoirs already provided in such valves.

Using the conventional plastic incompressible lubricants currently available for plug valves I have found that the volume of gas that can be incorporated and retained for a substantial period in discrete dispersions varies from impractically small amounts up to about 30 percent by volume at ambient temperatures, but that in general the period of retention of the lubricant in actual valve service is comparatively short due to limited retention of the dispersed discrete bubbles. However, in some of my improved compositions I have been able to incorporate up to 50 percent or more by volume of air with substantially permanent bubble stability in service, as will be hereinafter set forth in detail.

While even very small amounts of incorporated discrete gas bubbles are beneficial, as a practical matter I have found it desirable to provide for a conventional plug valve assembly, a preferred range of gas by volume of from 10 percent to 50 percent, depending upon the particular conditions of service and the structural characteristics of the valves used.

It is to be understood that my energizable lubricants, as made available for use in stick or bulb form contain the mass of dispersed discrete gas bubbles at atmospheric pressures at which they are stored or handled. The energy which is available for automatically lubricating the valves is incorporated during injection, or previously energized in separate pressure vessels which can be attached to the valves. At elevated temperatures the relative volume of gas bubbles increases due to expansion and the temperature of service is a determining factor in the volume percentage of gas included.

My improved valve lubricants and sealants in the form of sticks or bulk, when examined superficially, look very much like the ordinary non-energizable valve lubricants heretofore in use, but have a distinctly different appearance under a microscope due to the incorporation of the minute dispersed bubbles of gas.

It is accordingly a primary object of the present invention to provide novel energizable sealing and lubricating compositions and methods of their formulation and production.

Another object of my invention is to provide novel lubricating and sealing compositions containing stable dispersions of small discrete bubbles of compressible and expansible gas, and methods of their formulation and use.

Another object of the invention is the provision of dispersions of small discrete gas bubbles in matrices of plastic sealants and lubicants which are highly stable under repeated compression and expansion for substantial periods of time in service.

A further object of the present invention is to provide lubricants which are particularly resistant to attack from hydrocarbon-water combinations.

Other objects of the invention will be apparent to those skilled in the art from the appended claims and from the following detailed description of a preferred composition of the present invention with a dispersion of gas particles therein.

In practice, my starting point for the development of an energizable lubricating and sealing composition for a specific service is to use the best available conventional valve lubricant for that service as an initial basis for comparison of characteristics, and to determine whether a desirable bubble dispersion can be formed in it. If the resultant product is lacking in desirable characteristics, other matrix compositions are prepared of material deemed most likely to be suitable for the specific service conditions.

Energizable compositions so produced, are first subjected to a preliminary visual examination, specific gravity determination, and microscopic examination. If apparently satisfactory, they are then subjected to actual valve tests. For comparative evaluations of these compositions the test apparatus consists of a standard 2-inch figure 1924 "Nordstrom" valve, as it was found by experience that compositions showing satisfactory performance in this valve will perform satisfactorily in all other "Nordstrom" valve sizes and types. The performance of the lubricant in the test valve is evaluated on the basis of its ability to maintain the valve in a fully lubricated condition by automatically replenishing given unit quantities of lubricants removed from the valve. The unit of lubricant consumption has been empirically fixed at the complete removal of the amount of lubricant contained in one plug lubricant groove, which is disconnected from the reservoir and exposed to the action of line fluid at a valve body port when turning the valve. Under test, the lubricant is removed from the exposed groove while in a cocked position, and the plug is then returned to full open or full closed position whereupon the empty groove is reconnected with the reservoir, thereby permitting refilling. If the lubricant groove is automatically refilled completely for a minimum of six successive operations, allowing a period of five minutes after closing the valve for each automatic refilling, the lubricant is then subjected to a stability test by again compressing it to a pressure of 1000 p.s.i. and allowing it to remain under compression for a week in the test valve. If the pressure is substantially maintained without loss, it is then considered to possess satisfactory stability. The lubricants that pass this valve test are then subjected to actual service tests.

In the formulation of my improved compositions, in addition to the constituents used, the method of blending as well as the method of incorporating the gas are important in obtaining optimum results. The temperatures of blending, mixing, and gas incorporation in the formulation of my improved compositions as hereinafter set forth are controlled by use of equipment having suitable heating and cooling arrangement.

The degree to which a gas dispersion can be formed in a lubricant of a given composition depends upon its physical characteristics and the procedure followed in regard to cooking temperature, speed and type of agitation, type of equipment used, and the like, in a manner that will be readily apparent to those skilled in the art from a consideration of the technique hereinafter set forth in detail in describing the production of my preferred compositions.

In general the compositions of the present invention have as essential ingredients, a base lubricant ingredient, a thickener, and a substance (referred to hereinafter as a gas entraining agent) which enables the composition to retain a stable dispersion of small discrete gas bubbles.

A general formula for my compositions is as follows:

| | Parts by weight |
|---|---|
| Base lubricant ingredient | 20–80 |
| Thickener | 5–55 |
| Gas entraining agent | 5–20 |

The proportions of ingredients, however, may vary beyond the above limits in unusual service applications. These limits, therefore, are not to be taken as critical since in certain isolated instances, one or more ingredients of an optimum lubricant formulation may fall without the indicated range.

Base lubricant ingredients which have been found particularly suitable or ricinoleic acid derivatives of polyhydric alcohols such as for examples:

| | |
|---|---|
| Castor oils | Glyceryl triricinoleates |
| Glycol monoricinoleate | $C_2H_4OH$-ricinoleate |
| Glyceryl monoricinoleate | $C_3H_5(OH)_2$-ricinoleate |

Others are:

Di-o-xenyl monophenyl phosphate
Toluene sulfonamides

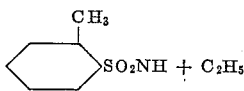

e.g., a mixture of ortho- and para-n-ethyl toluene sulfonamides such as currently manufactured by the Monsanto Chemical Co. and marketed under the name "Santicizer" #8. (Santicizer is a registered trademark).

Hydrogenated methyl ester of rosin
Methyl phthalyl ethyl glycolate

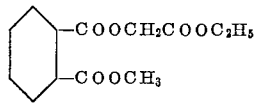

A suitable thickener may be any individual or combination of the following materials:

Aluminum ricinoleate ____ Aluminum soap of ricinoleic acid $$[CH_3(CH_2)_5CHOHCH_2CH=CH-(CH_2)_7COOH]$$

Lithium soaps
    Lithium stearate _____ $C_{17}H_{35}COOLi$
    Lithium hydroxy stearate . Lithium soap of hydroxy stearic acid $$C_{17}H_{34}OHCOOLi$$

The above are preferred lithium soaps; however, soaps usable with the present invention are lithium soaps based on or derived from a proprietary class of mixed fatty acids typified by the Armour "Neo-Fats" such as: NF18, commercially pure stearic; NF18–55, triple pressed stearic; NF18–58, hydrogenated tallow; NF18–61, stearic, palmitic; etc.

Mixed terphenyls __ Mixture of isomeric terphenyls e.g. A preferred mixture having an initial softening point of 140° F., upper hold point ranging 278–293° F. manufactured by Monsanto Chemical Co. and marketed under the name "Santowax" R. (Santowax is a registered trademark.)

Hydrogenated castor oil ___ This is the same as castor oil except that there is no double bond between the number 9 and 10 carbon atoms.

Vegetable wax ____ E.g. carnauba, natural wax of the carnauba palm.

Other thickeners which may be used individually or in combination with each other or with the above listed thickeners include thermoplastic resin compounds currently marketed under the name "Omamids" by Olin-Mathieson, and the name "Versamids" by General Mills.

Versamids are a group of amber colored thermo-plastic materials with molecular weights ranging from 3000 to 10,000 and softening points from 43 to 190° C. Versamids 900 and 940 have been found to give particularly good results. They are prepared by the condensation of polymerized unsaturated fatty acids (e.g. dilinoleic acid) with aliphatic amines such as ethylene diamine. The resulting resins may be either hard solids which will fracture readily at room temperature, or soft and tacky materials. They are resistant to water, alkali, mild acids, oils and most organic solvents. The preferred resins utilized in the compositions of the present invention have the following physical properties:

(1) Acid number _____ 7
(2) Specific gravity _____ .98
(3) Ball and ring softening point (A.S.T.M.) _____ 105–190 degrees C.
(4) Average molecular weight of resin ___ 3000–9000.

The Omamids are related to Versamids and they are produced by reacting polyamides with polycarboxylic acids. The materials may differ as to choice of starting acids and amides. Thus, the hardness, melting point, etc., will depend on the polycarboxylic acid chosen for reaction as well as the polyamide used. The resins used are cured, non-reactive thermo-plastics with a definite solubility in oils of the castor oil type.

In accord with the present invention, it has been found that the present lubricant compositions will not effectively retain a dispersion of discrete gas particles in the absence of one of a certain class of ingredients and the latter are therefore designated as gas entraining agents. The gas entraining agents preferred by application are the polyester resins which are:

Polycondensation products of polyhydric alcohols and polybasic acids, alone, or modified by monocarboxylic acids, monohydroxy alcohols, or small amounts of polycarboxylic acids or polyhydroxy alcohols.

Polyester resins having a wide range of molecular weight and various starting materials may be employed in applicant's novel lubricants depending upon the service condition for which a particular lubricant is formulated. In general, however, those polyesters which will give the desired results will be found to be liquid products at room temperatures.

Particular polyester resins which have been successfully employed in the novel lubricants are those designated as alkyd resins. In the lubricant industry the term alkyd resin has through long usage come to have the following meaning:

Resinous reaction products of polyhydric alcohols and polybasic acids, especially the resinous reaction products of diethylene glycol and phthalic anhydride.

A second particular class of polyester resins successfully employed in the compositions of the present invention is the class of materials termed terpene maleates. A terpene maleate is:

The reaction product of a polyhydric alcohol and terpinene-maleic anhydride.

Terepene maleates are fully described in United States Patent No. 1,993,027 issued March 5, 1935, to Ernest G. Peterson for Composition of Matter and Method of Producing which is, by reference, incorporated herein.

The gas entraining agent may also incidentally impart a thickening character to the compositions, but their primary importance resides in causing the gas bubbles to be relatively permanently suspended in the lubricant matrix.

The following examples will serve to illustrate the formulation principle of compositions of the present invention. Opposite each ingredient a preferred range and a preferred specific amount of each ingredient within the limits of the preferred range are given; however, the operative range of relative ingredient amounts may be somewhat broader.

*Example 1*

|  | Preferred range in parts by weight (P.B.W.) | Preferred P.B.W. |
| --- | --- | --- |
| Castor oil (pale blown) | 20–50 | 35 |
| Lithium stearate | 25–55 | 40 |
| Mixed terphenyls | 7–18 | 12 |
| Alkyd resin | 5–15 | 11 |
| Terpene maleate | 0–4 | 2 |

Place one-half of the castor oil into a kettle, and start the agitator. Add one-half of the lithium stearate slowly to the mixer and form a paste, and then add the balance of castor oil and lithium stearate to the mixer in small alternate portions, keeping the mixture in a paste form at all times. Add the "Santowax" (mixed terphenyls) slowly and mix completely. Turn on steam (120 p.s.i.) and heat to 280° F. Turn off the steam and cool mixture with agitation to 200° F., by allowing water to circulate through mixer's jacket. Add the alkyd resin and terpene maleate which have been previously mixed and heated to 250° F. until uniform. Temperature of the alkyd resin and terpene maleate mixture should be approximately 200° F. when added to the mixer. Continue agitation and cool to 100° F. (this is important). Thereafter a sample is tested for specific gravity every half-hour and agitation is continued between 110° F. and 100° F. until the specific gravity shows the desired compressibility, at which time the batch is complete and ready to discharge.

*Example 2*

|  | Preferred Range | Preferred P.B.W. |
| --- | --- | --- |
| Di-o-xenyl monophenyl phosphate | 60–80 | 70 |
| Lithium hydroxy stearate | 15–25 | 20 |
| Alkyd resin | 5–15 | 10 |

*Example 3*

|  | Preferred Range | Preferred P.B.W. |
| --- | --- | --- |
| Castor oil | 35–65 | 50 |
| Aluminum ricinoleate | 10–20 | 15 |
| Reaction product of a polyamide with a polycarboxylic acid | 5–20 | 15 |
| Hydrogenated castor oil | 3–15 | 10 |
| Polyester resin | 5–15 | 10 |

*Example 4*

The lubricant of Example 4 was prepared in the same manner as the lubricant of Example 1, but has the following formulation of relative amounts:

|  | Parts by weight |
| --- | --- |
| Castor oil | 35 |
| Mixed terphenyls | 15 |
| Lithium stearate | 38 |
| Alkyd resin | 11 |
| Terpene maleate | 1 |

*Example 5*

|  | Preferred P.B.W. |
| --- | --- |
| Toluene sulfonamides | 45.0 |
| Lithium stearate | 35.0 |
| Terpene maleate | 10.0 |
| Mixed terphenyls | 10.0 |

*Example 6*

|  | Preferred P.B.W. |
| --- | --- |
| Di-o-xenyl monophenyl phosphate | 25.0 |
| Mixed terphenyls | 20.0 |
| Lithium stearate | 43.0 |
| Alkyd resin | 11.0 |
| Terpene maleate | 1.0 |

*Example 7*

| Methyl phthalyl ethyl glycolate | 45.0 |
| --- | --- |
| Lithium stearate | 35.0 |
| Terpene maleate | 10.0 |
| Mixed terphenyls | 10.0 |

*Example 8*

| Castor oil (P.B.) | 45.0 |
| --- | --- |
| Lithium stearate | 35.0 |
| Terpene maleate | 20.0 |

*Example 9*

| Hydrogenated methyl ester of rosin | 50.0 |
| --- | --- |
| Lithium stearate | 40.0 |
| Terpene maleate | 10.0 |

Any one of the base lubricant ingredients or any combination thereof can be used with any individual or combination of thickeners, and with any gas entraining agent or combination of gas entraining agents. Therefore, it is obvious that numerous additional examples of compositions tried can be given. Examples 3, 4, 5, and 6 illustrate combinations of thickeners while Example 1 illustrates a combination of gas entraining agents utilized in the compositions of the present invention.

In other words, the various ingredients listed above are entirely compatible with each other, and may be intermixed as desired to obtain slight variations in thickness, lubricity or amount of bubble retention and bubble size. Taking a particular service falling within the above described hydrocarbon-water service class, the variable factors such as viscosity, thermal resistance, etc., may be adjusted as desired for the specific service by varying the ingredients as indicated. Lubricants for the hydrocarbon-water service classification provide optimum results under normal conditions when used with a viscosity of between 12,000 and 25,000 poises (at shear rate of $10^{-1}$ seconds temperature 75° F.).

The gas particle or bubble sizes, range in size in the uncompressed lubricants from a minimum diameter of about 1 micron before the lubricant is compressed within the reservoir in or attached to the valve. These gas particles or bubbles constitute discrete, elastic cells which, even in direct mutual contact do not merge together or squash out of the material, as in substances like aerated soap wherein the gas is merely entrained in the colloidal structure or between crystals.

The capacity of a particular lubricant for maintaining gas (preferably air) in large volume in the above described bubble distribution determines the eventual power of the compressed lubricant. Hence, the optimum lubricant is one which provides an adequate film at the eventual bearing surface and contains a maximum volume of gas dispersed throughout in bubbles that remain discrete and stable both in stock prior to use in a valve or the like, and in compression as when energized in a valve or the like. In practice, my materials retain incorporated gas when standing packaged for periods up to six months and more and also retain their energy when compressed for periods up to six months or more.

My improved lubricants are available in the usual commercial plastic stick, bulk, and soft bulk forms. The sticks are inserted into the valve lubricant chambers and compressed by lubricant screws in the usual manner, the bulk forms may be rolled into sticks or injected by screw-type grease guns, and the soft bulk forms are injected by quick-acting or booster-type grease guns in the well known manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A sealing and lubricating composition of matter containing a multiplicity of small discrete gas particles that remain in stable dispersion in an amount sufficient to render the composition matrix compressible to a fraction of its original volume and continuously re-expansible under the particular service conditions in which said sealing and lubricating composition will be used, said matrix comprising:
    (a) at least one base ingredient selected from the group consisting of:
        Ricinoleic acid esters of polyhydric alcohols
        Di-o-xenyl monophenyl phosphate
        Toluene sulfonamides
        Hydrogenated methyl ester of rosin, and
        Methyl phthalyl ethyl glycolate;
    (b) a thickener in an amount sufficient to render the composition a nonliquid soft flowable plastic matrix, said thickener being at least one substance selected from the group consisting of:
        Aluminum ricinoleate
        Lithium stearate
        Lithium hydroxy stearate
        Mixed terphenyls
        Hydrogenated castor oil, and
        Vegetable wax
        Reaction product of a polyamide with a polycarboxylic acid
        Condensation product of a polymerized unsaturated fatty acid with an aliphatic amine; and
    (c) a gas entraining agent in an amount sufficient to retain said dispersion of gas particles in said matrix, said gas entraining agent being at least one polyester resin.

2. The sealing and lubricating composition as defined in claim 1, wherein said gas entraining agent includes at least one polycondensation product of a polyhydric alcohol and terpinene-maleic anhydride.

3. The sealing and lubricating composition as defined in claim 1, wherein said composition has a viscosity between about 12,000 poises and about 25,000 poises at a shear rate of $10^{-1}$ seconds at a temperature of 75° F.

4. The sealing and lubricating composition as defined in claim 1, wherein the gas particles have a median diameter ranging from about one to about 100 microns.

5. The sealing and lubricating composition as defined in claim 1, wherein the ingredients of said composition have substantially the following proportions:

| | Parts by weight |
|---|---|
| Base ingredient | 20–80 |
| Thickener | 5–55 |
| Gas entraining agent | 5–20 |

6. The sealing and lubricating composition as defined in claim 1, wherein said small discrete gas particles comprise from about 10 percent to about 50 percent of said composition by volume.

7. A sealing and lubricating composition of matter consisting essentially of a plastic matrix containing a multiplicity of small discrete gas particles that remain in stable dispersion in an amount sufficient to render the matrix compressible to a fraction of its original volume and re-expansible under the particular service condition in which the sealing and lubricating composition will be used, said matrix consisting essentially of:

| | Parts by weight |
|---|---|
| Castor oil | 20–50 |
| Lithium stearate | 25–55 |
| Mixed terphenyls | 7–18 |
| Polycondensation product of a polyhydric alcohol and terpinene maleic anhydride | 0–4 |
| Reaction products of diethylene glycol and phthalic anhydride | 5–15 |

8. A sealing and lubricating composition of matter consisting essentially of a plastic matrix containing a multiplicity of small discrete gas particles that remain in stable dispersion in an amount sufficient to render the matrix compressible to a fraction of its original volume and re-expansible under the particular service condition in which the sealing and lubricating composition will be used, said matrix consisting essentially of:

| | Parts by weight |
|---|---|
| Di-o-xenyl monophenyl phosphate | 60–80 |
| Lithium hydroxy stearate | 15–25 |
| Reaction product of diethylene glycol and phthalic anhydride | 5–15 |

9. A sealing and lubricating composition of matter consisting essentially of a plastic matrix containing a multiplicity of small discrete gas particles that remain in stable dispersion in an amount sufficient to render the matrix compressible to a fraction of its original volume and re-expansible under the particular service condition in which the sealing and lubricating composition will be used, said matrix consisting essentially of:

| | Parts by weight |
|---|---|
| Castor oil | 35–65 |
| Aluminum ricinoleate | 10–20 |
| Reaction product of a polyamide with a polycarboxylic acid | 5–20 |
| Hydrogenated castor oil | 3–15 |
| Polyester resin | 5–15 |

References Cited by the Examiner

UNITED STATES PATENTS

| 1,993,025 | 3/1935 | Peterson et al. | 260—78.5 |
| 1,993,027 | 3/1935 | Peterson | 260—75 |
| 3,118,838 | 1/1964 | Scherer | 252—15 |
| 3,121,686 | 2/1964 | Scherer | 252—15 |

DANIEL E. WYMAN, *Primary Examiner.*

JOSEPH R. LIBERMAN, *Examiner.*

I. VAUGHN, *Assistant Examiner.*